United States Patent Office 3,002,037
Patented Sept. 26, 1961

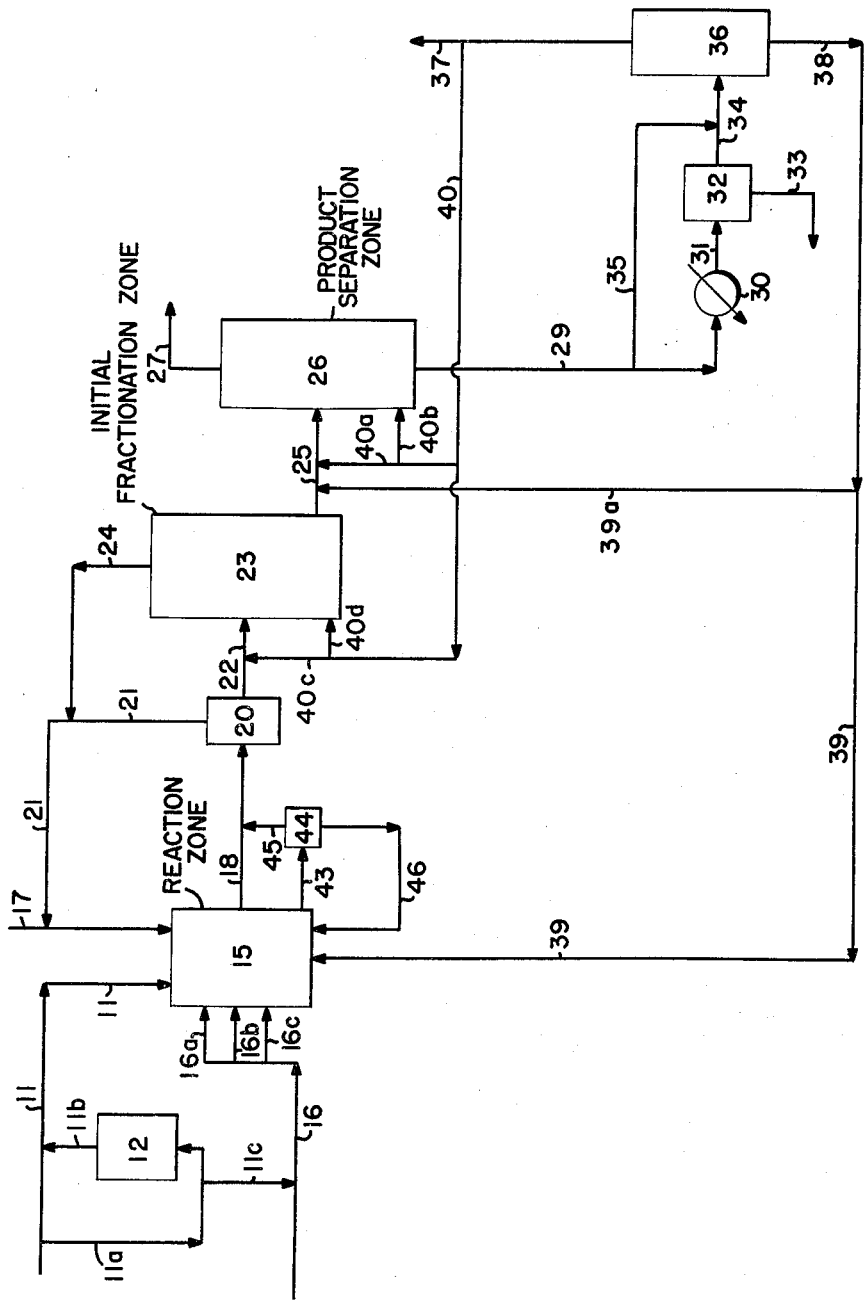

3,002,037
CATALYTIC TREATMENT OF HYDROCARBONS IN THE PRESENCE OF NAPHTHENES
Paul Greiff, Long Branch, and Charles E. Jahnig, Rumson, N.J., assignors to Esso Research and Engineering Company, a corporation of Delaware
Filed May 22, 1959, Ser. No. 815,025
8 Claims. (Cl. 260—683.53)

This invention concerns the preparation of branched chain paraffin hydrocarbons in the gasoline boiling range by the catalytic treatment of paraffin hydrocarbons. More especially the invention concerns improvements in the recovery and re-use of aluminum halides that have been employed as catalysts in relatively low temperature hydrocarbon conversion reactions, and particularly in such reactions where naphthene hydrocarbons that are present in the feedstocks have an influence on the reaction. The invention also concerns improvements in methods for controlling the concentration of naphthenes in reactions of the stated type when recovering and re-using the catalyst in the reaction.

As the automotive industry continues to equip more and more motor cars wth high compression engines, the petroleum industry is faced with the problem of meeting the requirements of those engines by supplying adequate quantities of motor fuel of high octaine rating. Many processes that have been employed in the past for providing high octane rating gasoline components, such as polymerization and conventional alkylation, have required the use of olefins, of which there is normally only a limited supply. Hence, a process which does not require olefins has many attractions.

It has recently been found that by the use of a promoted aluminum bromide catalyst, butanes and/or pentanes can be reacted directly with higher paraffin hydrocarbons of from 6 to 18 carbon atoms to give good yields of $C_5$ to $C_7$ branched chain saturated paraffin hydrocarbons of high octane rating. The conditions employed are those that favor simultaneous cracking, isomerization and alkylation reactions. The quantity of the butane or pentane in the reaction is considerably greater than the quantity of the higher paraffin hydrocarbon and there is a net consumption of the lower hydrocarbon. Most desirably, conditions are such that the products of the reaction predominate in $C_5$ and $C_6$ paraffin isomers with smaller proportions of $C_7$ isomers. Since there is a net consumption of the lower boiling and higher boiling reactants and a net production of intermediate hydrocarbons, in effect, one paraffin hydrocarbon is alkylated with another paraffin hydrocarbon. Accordingly, the process may be termed a paraffin alkylation process.

The reaction conditions that are favorable for obtaining the desired products, in a paraffin alkylation reaction of the type described, include reaction temperatures in the range of about 30 to 140° F. and pressures sufficiently high to maintain the reacting hydrocarbons in the liquid phase. At temperatures above about 140° F. excessive cracking occurs and the principal products obtained are propane and lighter materials. The preferred temperature range is from about 50° to about 120° F. It is necessary, in order that high yields of the desired $C_5$ and $C_6$ hydrocarbons be obtained, that the aluminum bromide be associated with a promoter such as a metal oxide or with a complex-forming material such as chlorine, bromine or an alkyl halide. Aluminum bromide alone, or even in the presence of hydrogen bromide, but in the absence of one of the promoters mentioned, is relatively ineffective for catalyzing the desired reaction. Among the preferred metal oxide promoters that may be used are included calcined bauxite, silica gel and gamma alumina.

The feed stock to the process must be essentially free of aromatic constituents and not more than about 0.02 wt. percent of such material should be present. It would be preferred to conduct the described reaction in the absence of naphthene hydrocarbons because the latter compounds tend to inhibit the reaction to some extent. However, from a practical standpoint, naphthenes must be tolerated in the process because their removal from the feed stream is difficult and costly. Accordingly, it is a principal object of the present invention to provide methods and means for conducting a paraffin alkylation process with feedstocks containing naphthenes.

One disadvantage in the use of aluminum bromide as a catalyst in the reactions outlined above is that it is appreciably soluble in the products. Because of this, a practical means must be available for recovering the aluminum bromide from the reactor effluent so that it can be reused in the process. The recovery methode emplyode must be one that will not cause degradation of the reaction products or of the catalyst. Accordingly, it is another object of the invention to provide a recovery method that will avoid such degradation.

In accordance with the present invention, particular use is made of the naphthenes naturally occurring in the feed hydrocarbons to a paraffin alkylation reaction to regulate the reaction, and means are provided for keeping the naphthene content of the reacting materials within limits that can be handled by the catalyst without undesirably inhibiting the reaction. Use of the naturally occurring naphthenes is also made to assist in the efficient recovery of the aluminum bromide catalyst, as will be shown in the ensuing description.

The nature and objects of the invention will be more readily understood when reference is made to the accompanying drawing in which the single figure is a schematic flow diagram showing how the process may be conducted.

The process will be described with particular reference to the use of isobutane as the lighter paraffin hydrocarbon component in a paraffin alkylation reaction. Referring now to the drawing, a suitable butane feed stream that at least initially contains a major proportion of isobutane is conducted into reaction zone 15 by means of line 11. Reaction zone 15 contains aluminum bromide associated with a suitable metal oxide support. Since some of the aluminum bromide will leave the reaction zone in solution in the hydrocarbons, it is necessary to add make-up aluminum bromide. Accordingly, a portion of the isobutane feed stream is diverted by means of line 11a through an aluminum bromide pickup vessel 12 to dissolve aluminum bromide in the diverted stream. The diverted stream containing dissolved aluminum bromide is then returned to line 11 by means of line 11b.

A stream containing higher paraffin hydrocarbons in the range of 6–18 carbon atoms, as for example a heavy naphtha cut containing from 5 to 15% naphthene hydrocarbons, is conducted into the reaction zone by means of line 16. Preferably the latter stream enters the reaction zone at a plurality of spaced points 16a, 16b, etc. in order to insure as high a ratio as possible of isobutane to the higher boiling paraffins at any particular section of the reaction zone.

Reaction zone 15 contains one or more beds of a suitable support, preferably a metal oxide. Among the supports that are preferred are calcined bauxite, silica gel and gamma alumina. A calcined bauxite that may be employed as a catalyst promoter can be obtained commercially under the trade name "Porocel." It is preferred that the bauxite be dehydrated before it is used. This may be accomplished by heating the material for from about 1 to 3 hours at 1100° to 1200° F. Preferably the support is saturated with aluminum bromide, and additional aluminum bromide is present in solution.

The amount of aluminum bromide held by the support will depend on the particular support used. Porocel, for example, will adsorb about 50 weight percent of AlBr$_3$. In addition it is preferred that the hydrocarbons in contact with the support in the reaction zone contain from about 0.2 to about 5 weight percent, and more preferably from about 0.5 to about 2 weight percent of dissolved aluminum bromide.

In paraffin alkylation reactions it is important, for minimum catalyst consumption, to employ AlBr$_3$ of very high purity (99% or higher) rather than technical grades of about 96% purity. When the pure grade is used rather than the technical grade, catalyst consumption may be reduced as much as 60 to 80 percent.

For better control of the reaction it may be desirable to premix at least a portion of the isobutane with the higher paraffin hydrocarbon feed entering the reaction zone. This may be accomplished by diverting a portion of the isobutane in line 11a into line 16 by means of line 11c.

It is desirable that an auxiliary promoter be used in addition to the support, preferably a hydrogen halide promoter such as hydrogen bromide. The latter is employed in the range of from about 0.5 to about 5% by weight based on the total hydrocarbon feed. The hydrogen bromide may be introduced into the reaction zone by means of line 17 and will be recycled to that zone along with unreacted butanes by means of line 21.

The reaction product leaves reaction zone 15 through line 18 and is conducted into a hydrogen halide stripping zone 20 to remove the hydrogen halide promoter which can then be recycled to the reaction zone by means of line 21. The stripped products are then sent by means of line 22 to an initial fractionation zone 23. In the latter zone conditions are maintained to remove unreacted isobutane and normal butane overhead by means of line 24 so that they must be recycled to the reaction zone. The heavier products including C$_5$ hydrocarbons and higher boiling material are conducted by means of line 25 into a product separation zone 26 wherein C$_5$, C$_6$ and iso-C$_7$ hydrocarbons are distilled overhead through line 27. Preferably zone 26 is operated as a flash distillation zone to minimize product decomposition. Short residence times, i.e. of no more than about 2 minutes duration, are preferred.

The higher boiling material comprising the bottoms in zone 26 will contain dissolved aluminum bromide and is normally then recycled to the reaction zone. However, because the bottoms fraction in zone 26 will contain an appreciable quantity of naphthene hydrocarbons that are higher boiling than the products removed overhead, it is obvious that there will be a gradual build-up of those hydrocarbons in the reaction zone 15 if all of the naphthane hydrocarbons are recycled. Accordingly, means are provided for removing a portion of the naphthenes. This may be accomplished in the following manner. The bottoms from the product separation zone 26 are conducted by means of line 29 through a cooler 30 wherein the bottoms stream is cooled sufficiently to cause some of the aluminum bromide to precipitate from the solution. The resulting slurry of aluminum bromide and hydrocarbons is conducted by means of line 31 into a separation zone 32 which may comprise a filter or a settler or their equivalent. Aluminum bromide may be removed from the filter or settler through line 33 while the filtered or settled hydrocarbons will be conducted by means of line 34 into a concentrating zone 36 wherein a portion of the naphthenes may be removed overhead by distillation, through line 37, while the remaining material will leave the concentration through line 38. The hydrocarbon stream in line 38 will still contain some aluminum bromide and may be recycled to the reaction zone by means of line 39. The aluminum bromide recovered in line 33 may be returned to pick-up zone 12 by means not shown or it may be employed for other purposes.

The temperature in zone 36 will of course be high enough to distill the required quantity of naphthenes overhead but will be below the boiling point of aluminum bromide. Temperatures in the range of from about 225° F. and 400° F. are contemplated for distillation at atmospheric pressure, although lower temperatures at reduced pressures could also be employed.

It is a particular feature of the present invention that a portion of the naphthenes separated from the bottoms of product separation zone 26 is recycled to that zone to minimize decomposition of catalyst and product. This naphthene recycle can be supplied via line 40 from the overhead stream in line 37. Since these naphthenes are in the form of hot vapors, they can be introduced into the reboiler section of zone 26 by means of line 40b to supply heat for the fractionation tower. This will avoid the need for reboiling the concentrated aluminum bromide solution in the bottom of the tower, thus preventing corrosion and fouling. Some of the recycled naphthenes should also preferably be introduced in the region where the aluminum bromide enters the tower so as to ensure continuous protection of the catalyst against sludging. This can be accomplished by sending a portion of the naphthene vapors in line 40 into line 25 by means of line 40a. Additional naphthenes can be supplied by conducting a portion of the recycle stream in line 39 to line 25 via line 39a, since naphthenes will also be present in the recycle stream in line 39. The total concentration of naphthenes required in zone 26 to prevent the undesired decomposition will depend on the temperature in that zone and on the concentration of aluminum bromide in the hydrocarbons in that zone, and may vary in the range of from about 20 to 80 volume percent.

Naphthene vapors in line 40 can also be used to supply heat to zone 23 by sending some of those vapors to the reboiler section of zone 23 by means of line 40d. Some of the vapors can also be sent via line 40c to line 22 to mix with the feed to zone 23 if it is necessary to inhibit degradation in that zone.

Removal of naphthenes from the system via line 37 should be so adjusted that the naphthenes recycled to the reaction zone through line 39 will limit the build-up of naphthenes in reaction zone 15 so that a total naphthene concentration of no more than 20% will result. Preferably the total naphthene concentration in the reaction zone should be no greater than about 16%.

The method of recovering aluminum bromide from the bottoms before separating naphthenes, as described above, is particularly desirable when it is necessary to maintain low concentrations of aluminum bromide or low temperatures in concentrating zone 36 and because of cost considerations would ordinarily be used only if the concentration of aluminum bromide in the bottoms from zone 26 is prohibitively high. If higher concentrations of aluminum bromide in the latter zone do not lead to difficulties, cooling zone 30 and separation zone 32 may be by-passed and the bottoms from zone 26 sent directly to zone 36 via line 35.

The reaction has been particularly described with reference to the use of a supported aluminum bromide catalyst. To prepare the supported catalyst at the start of the process, the support may be saturated with aluminum bromide and then placed in the reaction zone, or, alternatively, the support may be placed in the reaction zone and then saturated with aluminum bromide carried in with a portion of the feed. Another method of preparation is to mix the aluminum halide with the support and to heat the mixture to effect impregnation. If desired, loosely held aluminum halide may be removed from the catalyst mass by heating the mass and passing through it a gas such as carbon dioxide, methane, hydrogen or nitrogen.

Alternatively, the support may be impregnated by dissolving the aluminum halide in a suitable solvent such as ethylene dichloride or dioxane, for example, and the porous carrier impregnated with this solution, followed by heating to remove the solvent and loosely held aluminum halide. Still another alternative is to employ a powdered support or promoter, mix the aluminum halide with it, and compress the mixture into pellets.

A mixed catalyst in which a portion of the aluminum bromide is replaced with aluminum chloride may be used provided that at least some aluminum bromide is present in the reacting hydrocarbons.

As a minimum it is preferred that the mol ratio of isobutane to higher paraffin be at least 3 to 1, but should preferably be no higher than about 10 to 1. If sufficient iso-$C_4$ is not present in the reaction zone to effect alkylation of the materials obtained when a higher paraffin or other higher product of the reaction is cracked by the catalyst, catalyst sludging will result.

Conventional procedures may be used for removing aromatics from the feedstocks. These include solvent extraction, acid treating, hydrogenation and selective adsorption, as with molecular sieve zeolites, for example. It is not necessary that the higher hydrocarbons used in the reaction be individual hydrocarbons such as heptane, octane, cetane, etc., but they may include mixtures. Thus various petroleum fractions may be used such as virgin naphthas, and paraffin raffinates from the solvent extraction of hydroformed petroleum fractions.

Feed rates may vary from about 0.2 to about 2 v./v./hr., the higher feed rates being preferred when little or no naphthenes are present.

Either downflow or upflow of the stream through the catalyst bed can be used in the process as described in conjunction with the drawing. Also in place of a fixed bed process, a moving bed of catalyst could be used. Alternatively, a slurry type of operation could be employed wherein a suspension of catalyst is maintained in the reacting hydrocarbons, the slurry being stirred in the reactor with suitable mechanical stirring means or recirculated through the reactor by pumping means. Where slurry operation is used, the slurry is removed from the reactor at the end of the reaction period, in the case of batch operation, or as a fraction of the circulating stream in the case of continuous operation, and sent to suitable separation equipment to separate the catalyst from the hydrocarbons. The separation equipment may comprise a simple settling tank, a centrifuge, or a filter, for example, or suitable combinations of such means. A preferred form of operation is one employing upflow of slurry, as in a hindered settler type of reactor.

It is also possible to operate the process with a liquid catalyst complex in place of the solid supported system described. In such a case, reaction zone 15 is preferably equipped with agitation means such as mechanical stirrers. A suitable liquid catalyst complex comprises aluminum bromide and chlorine or bromine, as for example a mixture of 100 parts by weight of $AlBr_3$ and from 25 to 75 parts by weight of bromine. Other catalyst complexes that may be used include an ethyl bromide-aluminum bromide complex in which the ratio of alkyl bromide to $AlBr_3$ is in the range of 1 to 1.5 moles per mole, a heptyl chloride-$AlBr_3$ complex in about a 1 to 1 mole ratio, and a complex prepared from dimethyl ether and $AlBr_3$ in the mole ratio range of about 0.3 to 0.65 mole of the ether and 1 mole of $AlBr_3$.

When employing a slurry operation or one involving the use of an immiscible catalyst complex, the reaction product leaving zone 15 will carry with it some of the catalyst as a separate phase which must be settled out and recycled to the reaction zone. This is done by conducting the products by means of line 43 into a separation zone 44 for separation of catalyst from the hydrocarbons. Zone 44 may comprise a centrifuge, for example, or may be a simple settling zone. Separated catalyst in zone 44 is recycled to the reaction zone via line 46, while the product, which is now free of immiscible catalyst but which still contains dissolved $AlBr_3$, is sent via line 45 to line 18 and handled as previously described.

The effect of naphthenes on the paraffin alkylation reaction is shown by the following example:

EXAMPLE

A mixture of 160 cc. of isobutane and 40 cc. of a normal heptane feed, which latter contained 95% normal heptane and 5 volume percent of methylcyclohexane, was contacted in a stirred reactor for a period of 3 hours at 72° F. using a catalyst system consisting of 23.6 grams of $AlBr_3$ and 47.2 grams of Porocel. At the end of the reaction period the yield of products was determined. The results are shown in Table I.

Table I.—Analysis of $C_5+$product, weight percent

| | |
|---|---|
| Iso-$C_5$ | 22.7 |
| n-$C_5$ | 2.9 |
| Total $C_5$ | 25.6 |
| Iso-$C_6$ | 15.1 |
| n-$C_6$ | 0.6 |
| Total $C_6$ | 15.7 |
| Iso-$C_7$ | 56.5 |
| n-$C_7$ | 2.2 |
| Total $C_7$ | 58.7 |

Using the same catalyst system and the same reacting hydrocarbon mixture as were employed in the above test, but varying the percentage of naphthenes, it was found that as the concentration of methylcyclohexane in the normal heptane feed was increased from a low value of 1 volume percent to a maximum of 20 volume percent the relative rate of conversion of heptane to $C_5$ and $C_6$ branched chain hydrocarbons was reduced by a factor of 3. While the conversion-rate-suppressing effect of naphthenes can be overcome to some extent by increasing the reaction severity somewhat, as for example by raising the temperature or lowering the feed rate, such expedients are desirable only within certain limits since lowered feed rates impair the economics of the process and elevated temperatures interfere with the optimum yields of desired isomers. Hence it is desirable that the maximum naphthene content in the reacting hydrocarbons be maintained at a figure no higher than 20 volume percent and preferably no higher than about 16 volume percent.

Although this invention is particularly applicable to paraffin alkylation reactions wherein the effect of naphthenes on the reaction rate is appreciable, the invention is also useful in isomerization reactions, wherein normal paraffin hydrocarbons of from 4 to 7 carbon atoms are converted to the corresponding branched chain isomers by the catalytic action of aluminum bromide. In such reactions the presence of naphthenes is helpful in preventing undesirable cracking. At the same time it is necessary that the concentration of naphthenes not be permitted to build up to the point where they would inhibit the reaction. The maximum concentration will depend upon the particular hydrocarbons isomerized. For hexane the maximum should be no higher than about 20 percent whereas for heptane somewhat higher percentages can be tolerated.

For isomerization, reaction temperatures of from about 50° to about 140° F. and pressures of from about atmospheric to about 200 p.s.i. may be employed in reaction zone 15. Preferably the reaction temperature is in the range of from about 60° to 80° F. for maximum production of highly branched isomers. Conditions are somewhat milder than those involved in paraffin alkylation reactions since no cracking is permitted to occur whereas in the latter type of reaction a certain amount of mild cracking is necessary.

It is to be understood that the scope of this invention is to be determined by the appended claims and that it is not to be limited to the specific examples herein presented or the specific embodiments herein described.

What is claimed is:

1. In the catalytic treatment of paraffinic hydrocarbons in the presence of aluminum bromide catalyst, in a reaction zone, wherein the products of the reaction comprise principally branched chain saturated paraffin hydrocarbons in the range of from 4 to 7 carbon atoms, and including the steps of removing from the reaction zone hydrocarbon products containing dissolved aluminum bromide, separating hydrocarbons from the removed product and recycling aluminum bromide to the reaction zone, and wherein at least one feed stream to the reaction zone contains naphthene hydrocarbons, thereby resulting in the presence of naphthene hydrocarbons in said reaction products, the improvement which comprises distilling the reaction products in a distillation zone whereby a bottoms fraction containing naphthene hydrocarbons and aluminum bromide is obtained, removing a portion of the naphthenes from the said bottoms fraction, recycling at least a portion of the remaining material to the reaction zone and recycling a portion of the naphthenes removed from said bottoms fraction to said distillation zone thereby increasing the naphthene concentration in that zone.

2. Process as defined by claim 1 including the step of separating a portion of the aluminum bromide from the said bottoms fraction prior to removing a portion of the naphthenes therefrom.

3. Process as defined by claim 2 wherein said separation of aluminum bromide is effected by cooling said bottoms fraction, thereby causing the formation of aluminum bromide crystals, and separating said crystals from the remaining liquid.

4. Process as defined by claim 1 wherein said catalytic treatment comprises the reaction of a minor proportion of a straight chain paraffin hydrocarbon of from 6 to 18 carbon atoms with a major proportion of a hydrocarbon selected from the group consisting of butanes and pentanes at a temperature of from about 50° to about 140° F.

5. Process as defined by claim 4 wherein the quantity of naphthenes removed from the said bottoms fraction is sufficient to maintain the total naphthene content in the reaction zone at a maximum that is no greater than 20 volume percent.

6. Process as defined by claim 1 wherein the removal of naphthenes from the said bottoms fraction is effected by distillation thereby forming naphthene vapors, and said vapors are employed to supply heat to the distillation zone in which said reaction products are distilled.

7. In the catalytic treatment of paraffinic hydrocarbons in the presence of aluminum bromide catalyst, in a reaction zone, wherein a minor proportion of a straight chain paraffin hydrocarbon of from 6 to 18 carbon atoms is reacted with a major proportion of a hydrocarbon selected from the group consisting of butanes and pentanes at a temperature of from about 50° to about 140° F. to produce branched chain saturated paraffin hydrocarbons in the range of from 4 to 7 carbon atoms, and including the steps of removing from the reaction zone a reaction product stream containing dissolved aluminum bromide and wherein at least one feed stream to the reaction zone contains naphthene hydrocarbons, thereby resulting in the presence of naphthene hydrocarbons in said reaction product stream, the improvement which comprises passing said reaction product stream to a first distillation zone wherein the $C_4$ hydrocarbons are segregated from said reaction product stream by distillation, directing the remaining portion of said reaction product stream to a second distillation zone wherein a bottoms fraction comprising aluminum bromide and naphthene hydrocarbons is segregated from the lighter hydrocarbons in said remaining portion of said reaction product stream, removing a portion of the naphthenes from said bottom fraction and recycling a portion of the naphthenes removed from said bottom fraction to said first distillation zone to increase the naphthene concentration therein.

8. The process of claim 7 wherein a portion of said naphthenes is recycled to said second distillation zone.

References Cited in the file of this patent

UNITED STATES PATENTS

| 2,349,458 | Owen et al. | May 23, 1944 |
| 2,370,144 | Burk | Feb. 27, 1945 |
| 2,395,022 | Sutton et al. | Feb. 19, 1946 |
| 2,412,143 | Gorin et al. | Dec. 3, 1946 |
| 2,436,944 | Sutherland | Mar. 2, 1948 |
| 2,438,421 | Sensel et al. | Mar. 23, 1948 |

FOREIGN PATENTS

| 559,199 | Great Britain | Feb. 9, 1944 |